United States Patent
Daimaru et al.

(10) Patent No.: US 6,750,959 B2
(45) Date of Patent: Jun. 15, 2004

(54) METHOD FOR PROCESSING A SPECTACLE LENS, LENS METER, AND APPARATUS FOR PROCESSING A SPECTACLE LENS, HAVING LENS METER AND DATA OF RELATIVE POSITIONS FOR PROCESSING A SPECTACLE LENS

(75) Inventors: Takashi Daimaru, Shinjyuku-ku (JP); Masahiko Samukawa, Shinjyuku-ku (JP)

(73) Assignee: Hoya Corporation, Tokyo (JP)

( * ) Notice: Subject to any disclaimer, the term of this patent is extended or adjusted under 35 U.S.C. 154(b) by 279 days.

(21) Appl. No.: 10/006,677

(22) Filed: Dec. 10, 2001

(65) Prior Publication Data

US 2002/0097389 A1 Jul. 25, 2002

(30) Foreign Application Priority Data

Dec. 11, 2000 (JP) .......................................... 2000-376392

(51) Int. Cl.$^7$ ................................................. G01B 9/00
(52) U.S. Cl. ....................................................... 356/127
(58) Field of Search ................................ 356/124–127; 351/44, 45, 47, 200

(56) References Cited

U.S. PATENT DOCUMENTS 4,180,325 A 12/1979 Humphrey
5,247,341 A 9/1993 Kurachi et al.
5,661,816 A 8/1997 Fantone et al.

FOREIGN PATENT DOCUMENTS

| JP | 54-014757 | 2/1979 |
|----|-----------|--------|
| JP | 60-017335 | 1/1985 |
| JP | 09-015097 | 1/1997 |
| JP | 2569718   | 4/1998 |
| JP | 11-218468 | 8/1999 |

OTHER PUBLICATIONS

European Search Report dated Jan. 29, 2003 for European Application No. EP 01 12 6225.

Primary Examiner—Michael P. Stafira
(74) Attorney, Agent, or Firm—Griffin & Szipl

(57) ABSTRACT

A method and apparatus enabling the placement of a mark on a lens at a desired position, easily and rapidly, without damaging the lens. The method comprising (1) the step of measuring a lens in which the optical properties and the reference position of the spectacle lens are measured and (2) the step of processing in which the lens is processed based on the optical information obtained in the step of measuring a lens. In the step of measuring a lens, the optical properties of the lens, such as the prism value, are measured using a desirable position selected as on the uncut lens as the position of measurement. An an optical reference position, such as the optical center, is calculated, a guiding mark is placed at the calculated position the relationship between the mark and the optical reference position is used in subsequent cut processing.

7 Claims, 10 Drawing Sheets

METHOD FOR PROCESSING A SPECTACLE LENS, LENS METER, AND APPARATUS FOR PROCESSING A SPECTACLE LENS, HAVING LENS METER AND DATA OF RELATIVE POSITIONS FOR PROCESSING A SPECTACLE LENS

FIELD OF THE INVENTION

The present invention pertains to a method for processing a spectacle lens comprising the steps of (1) measuring a lens and (2) processing the measured lens. The measuring step comprises obtaining optical information about the lens such as a prism value and other optical properties, as measured at a position of an optical reference point by using a lens meter. The subsequent processing step comprises processing the spectacle lens using the optical information obtained in the measuring step, wherein the optical information obtained is used as a portion of data for directing the processing of the lens. The present invention also encompasses a lens meter that includes an information processing portion for obtaining optical information used for directing the processing of the lens.

BACKGROUND OF THE INVENTION

Typically, a spectacle glass, such as an eyeglass or monocle lens, is prepared by processing an uncut spectacle lens (in general, a so-called round lens having a circular shape) into a desired shape corresponding to fit the shape of a spectacle frame. Then, the properly cut lens is fitted into the spectacle frame. The uncut round lens is prepared and supplied by a lens manufacturer, who selects the proper lens based on the data of the prescription of the eye of the person who will be wearing the spectacle glass. Typically, the useful eyeglass prescription data includes dioptric power, cylindrical dioptric power, the distance between the right and left eyes of the eyeglass wearer, and other like data. Furthermore, the manufacturer needs to know data on the shape of the spectacle frame selected by the person who will be wearing the spectacle glass and additional layout information.

Relevant measurements of the round lens supplied by the lens manufacturer are conducted by the manufacturer using a lens meter. The position of the optical center and the cylinder axis of the lens are obtained and marks showing the position of the optical center and the angle of the cylinder angle are placed on the lens. The marks are used as guide marks to show the position and the angle of attachment for a lens holder that is to be attached to the uncut lens before the lens is processed. The lens holder serves as a jig to define the axis of rotation for the lens during processing.

According to the conventional method for determining the position of the optical center of an uncut lens, a lens meter is used to measure an optical property of the lens, such as the prism value, at a position (a "point of measurement") on the lens empirically estimated to be close to the optical center. The measurement is repeated at different estimated positions ("points of measurement"), where each subsequent estimated position is determined by a reiterative computer algorithm, until a position is obtained where the difference between estimated positions is approximately zero. When this condition is found, the estimated position is taken to be the position of the true optical center. For an example of such a reiterative method, reference is made to the specifications of Japanese Utility Model No. 2569718 and Japanese Utility Model Application Laid-Open No. Heisei 1(1989)-135344).

In actual practice as shown in FIG. 14, a mark 600 is placed at the position of the optical center (O.C) of the spectacle lens, and two other marks 600a and 600b are placed at positions on either side of the optical center to define a straight line passing through the position of the optical center. This straight line is used to show, or define, the cylinder axis. Thus, the uncut lens has three marks.

However, it is a very complicated, tedious, and difficult task to visually measure the prism value or other optical properties at a position considered to be close, or approximate, to the true optical center. Specifically, it requires skill to use a lens meter to find a position on the lens where the value of the prism value is zero. Such a process requires a long time to determine an accurate position. Moreover, in the case of a plastic lens, sufficient care must be taken not to form scratches on the lens during this measuring process because the lens is moved on a processing table with each measurement.

The present invention has been conceived under the above circumstances, and has as an object, providing a method for processing a spectacle lens which enables convenient marking at a selected point of measurement on the lens. The marking is performed easily and rapidly without forming scratches on either the lens or the lens meter.

SUMMARY OF THE INVENTION

In accordance with the above aspects of the present invention, the data are saved representing the relative positions describing the relationship between the position of the mark placed at the selected point of measurement and the position of an optical reference point, which includes the position of the optical center. Therefore, when the position of the mark is detected to facilitate lens processing and the above relative positions are read, the position of the optical center or the like relative to the detected mark position can be known immediately. The position of blocking (also known as the "position of attachment" for the lens holder) can be decided based on the information obtained above and a lens holder can be attached so that the uncut lens can be properly processed by a lens cutting or grinding apparatus.

In accordance with one embodiment of the present invention, there is provided a method for processing a spectacle lens comprising the steps of: supplying an uncut lens and setting the lens in a lens meter; measuring optical properties of the lens at a point of measurement on the lens to generate measured data, wherein the optical properties include a prism value; calculating a calculated optical reference point position, including a calculated position of an optical center of the lens using the measured data; marking the lens with a mark placed at a position on the lens at the point of measurement or at a point relative to the point of measurement, and generating first mark data representing the position of the mark; processing the first mark data to determine a relative relationship between the position of the mark and the calculated position of the optical reference point, thereby generating third data representing the relationship between the position of the mark and the calculated position of the optical reference point; saving the third data to a memory medium, or recording the third data to a recording medium, or transmitting the third data from the lens meter to a lens processing apparatus, so that the first data is subsequently available for affecting lens processing; removing the lens from the lens meter and setting the lens on a processing table of a lens processing apparatus where blocking is performed; detecting the mark on the lens and measuring the position of the detected mark to generate second mark data, wherein the second mark data represents the position of the mark as measured; reading the third data from the memory when saved or from the recording medium when recorded, or receiving the third data from the lens meter; specifying a specified position of an optical reference point, including a specified position of the optical center, on the lens wherein the specified position of the optical reference point is determined using the measured mark data and the third data; blocking a lens holder to the lens at a position of attachment on the lens, where the position of attachment corresponds to the specified position of the optical reference point; and subsequently cut processing the uncut lens while blocked to the lens holder to produce a spectacle lens.

In accordance with another embodiment of the method of the present invention, it is sufficient during the step of measuring a lens that a mark be placed simply at a desired selected position. Complicated operations, such as measuring the prism value or the like at different positions on the lens with a lens meter to find the position where the specific optical property value obtained by the measurement becomes zero, are not necessary. Consequently, the guide mark can be placed rapidly and there is no possibility of forming scratches on the lens since the lens is not moved on the processing table during this marking process.

In accordance with another embodiment of the invention, the present invention is a lens meter comprising a first portion for measuring optical properties of an uncut lens; a second portion for marking the measured lens, and a third portion for information processing.

The method for processing a spectacle lens as well as the lens meter for measuring and marking the spectacle lens are described below as different embodiments of the present invention with reference to the Figures. Further objects, features and advantages of the present invention will become apparent from the Detailed Description of the Preferred Embodiments, which follows, when considered together with the attached drawings.

DETAILED DESCRIPTION OF THE PREFERRED EMBODIMENTS

Figure 1:
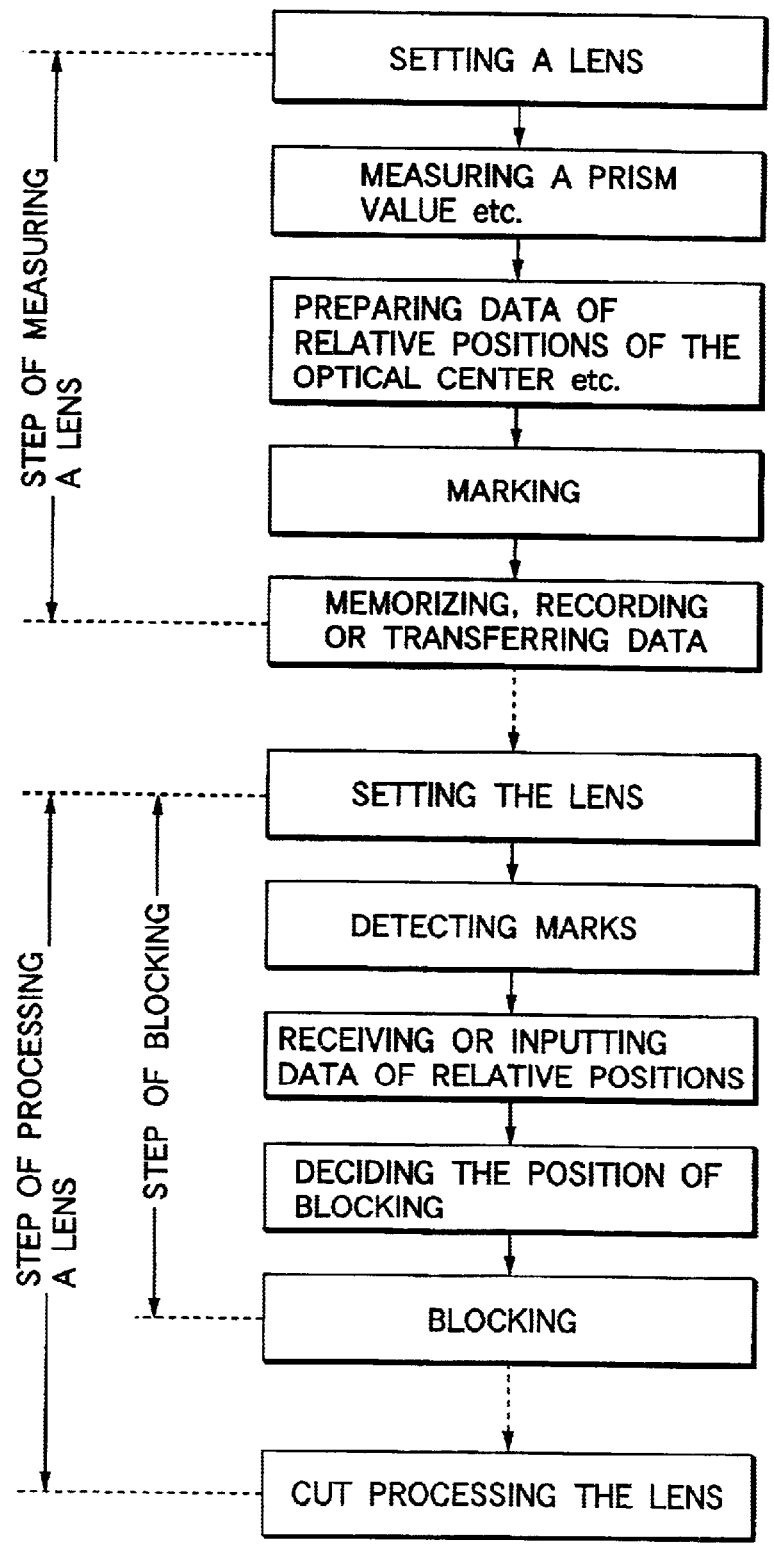
FIG. 1 shows a diagram describing the method for processing a spectacle lens in accordance with the first preferred embodiment of the present invention.

The method for processing a spectacle lens according to the first preferred embodiment of the present invention comprises (1) a step of measuring the lens and (2) a step of processing the lens as shown schematically in FIG. 1. In the step of measuring a lens, first a round lens is supplied by the lens manufacturer, wherein the supplied lens is selected based upon a specific lens prescription, and the selected uncut lens is properly set, or positioned, to be measured in a lens meter. Second, optical properties of the lens, such as the prism value, dioptric powers, etc., are measured and confirmed using a lens meter. Third, the position of an optical reference point, such as the optical center and the cylinder axis, are obtained or determined typically by calculation based upon the measured optical properties of the lens. Fourth, marks indicating the position of the optical center and the angle of the cylindrical axis are placed on the lens, and the data representing the location of the marked positions are saved.

The step of processing a lens comprises of (1) blocking a lens holder to the lens, and (2) cut processing the lens, typically by cutting or grinding. Specifically, the lens holder is a jig used to set or define the axis of rotation of the lens during lens cut processing and is necessarily attached, or blocked, to the lens before cut processing. Marks placed on the lens during the step of measuring the lens are utilized for determining the position for blocking that is chosen in the step of blocking a lens holder. Because the step of cut processing is conducted using a conventional spectacle lens processing apparatus for cutting or grinding the lens, the step of cut processing a lens will not be described in detail; however, the method for processing a spectacle lens, and the lens meter described above, will be described further as follows.

Figure 2:
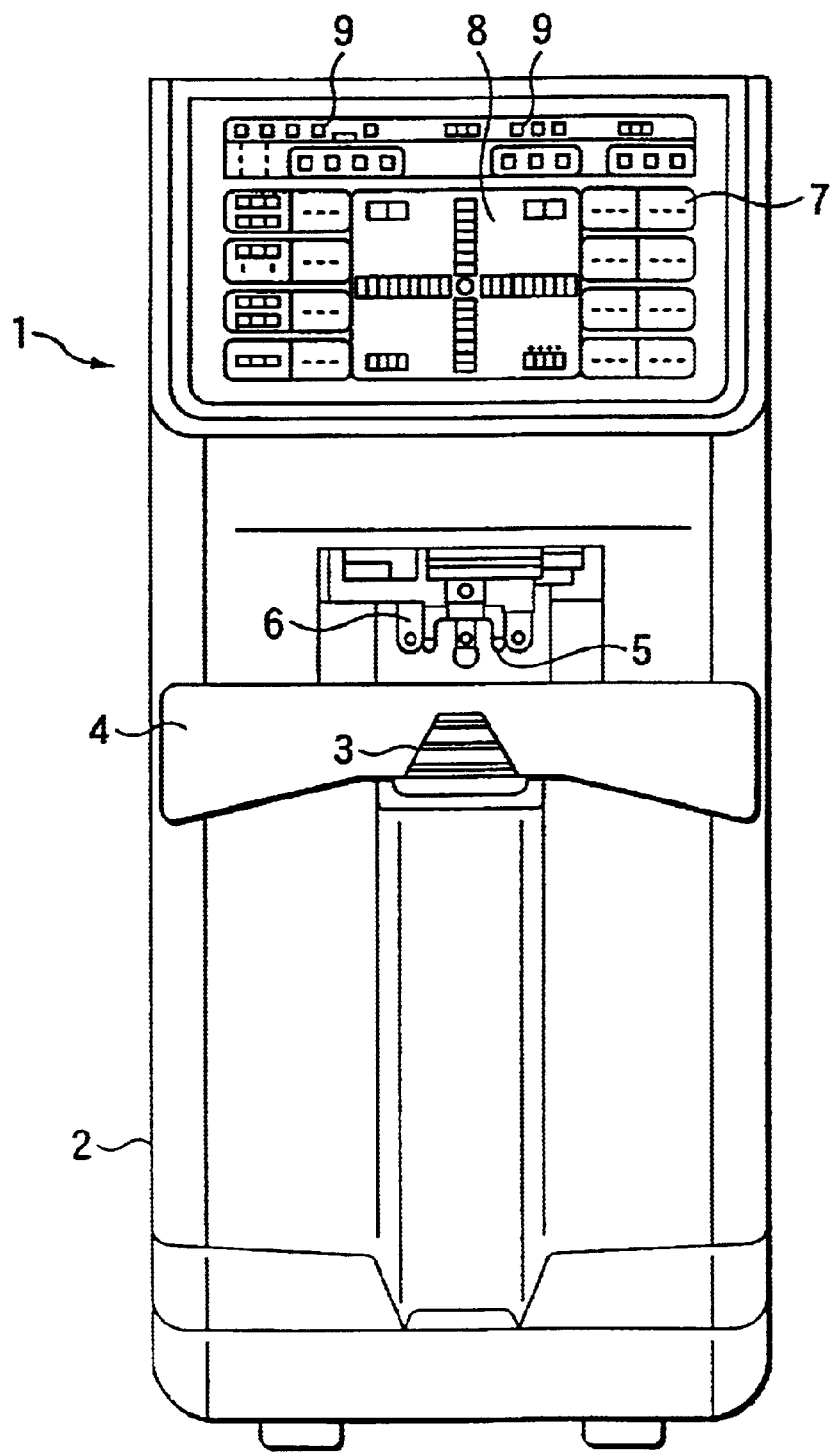
FIG. 2 shows a front view of the lens meter of the second preferred embodiment of the present invention.
Figure 3:
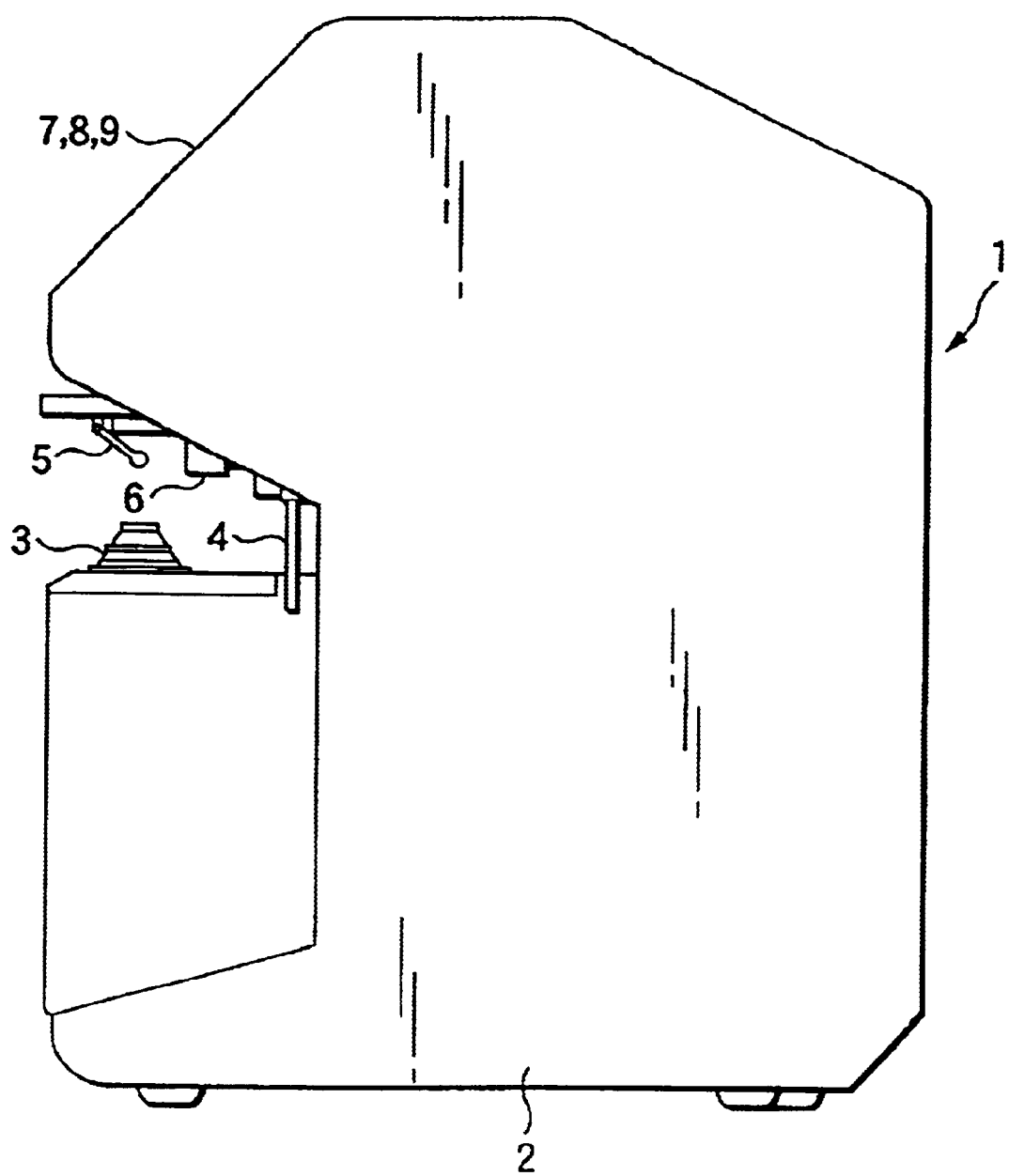
FIG. 3 shows a side view of the lens meter of the second preferred embodiment of the present invention.

As shown in FIGS. 2 and 3, the invention uses a measurement table 3 for placing a lens to be examined, wherein the measurement table 3 is disposed in a front portion of a main portion 2 of the lens meter 1. Behind the measurement table 3 (at a more inner position within the lens meter 1), a setting portion 4 for setting the position of a sample is disposed, wherein the setting portion 4 serves to help set the position of the uncut lens 18 (refer to FIG. 4) so that examination of the lens 18 can be performed. Above the measurement table 3, a holding portion 5 for holding a lens is disposed. Behind the holding portion 5 for holding a lens, a marking portion 6 for marking is disposed, wherein the marking portion 6 serves to mark the optical axis of the lens 18 to be examined. On the upper front face of the main portion 2, an operating panel portion 7, a first display apparatus 8, and a second display apparatus 9 are disposed. The operating panel portion 7 includes operational switches and a power source switch. The first display apparatus 8 serves to display the relative positions of the points of measurement and the position of the optical center of the examined lens. The second display apparatus 9 serves to display the results of the performed operation.

Figure 4:
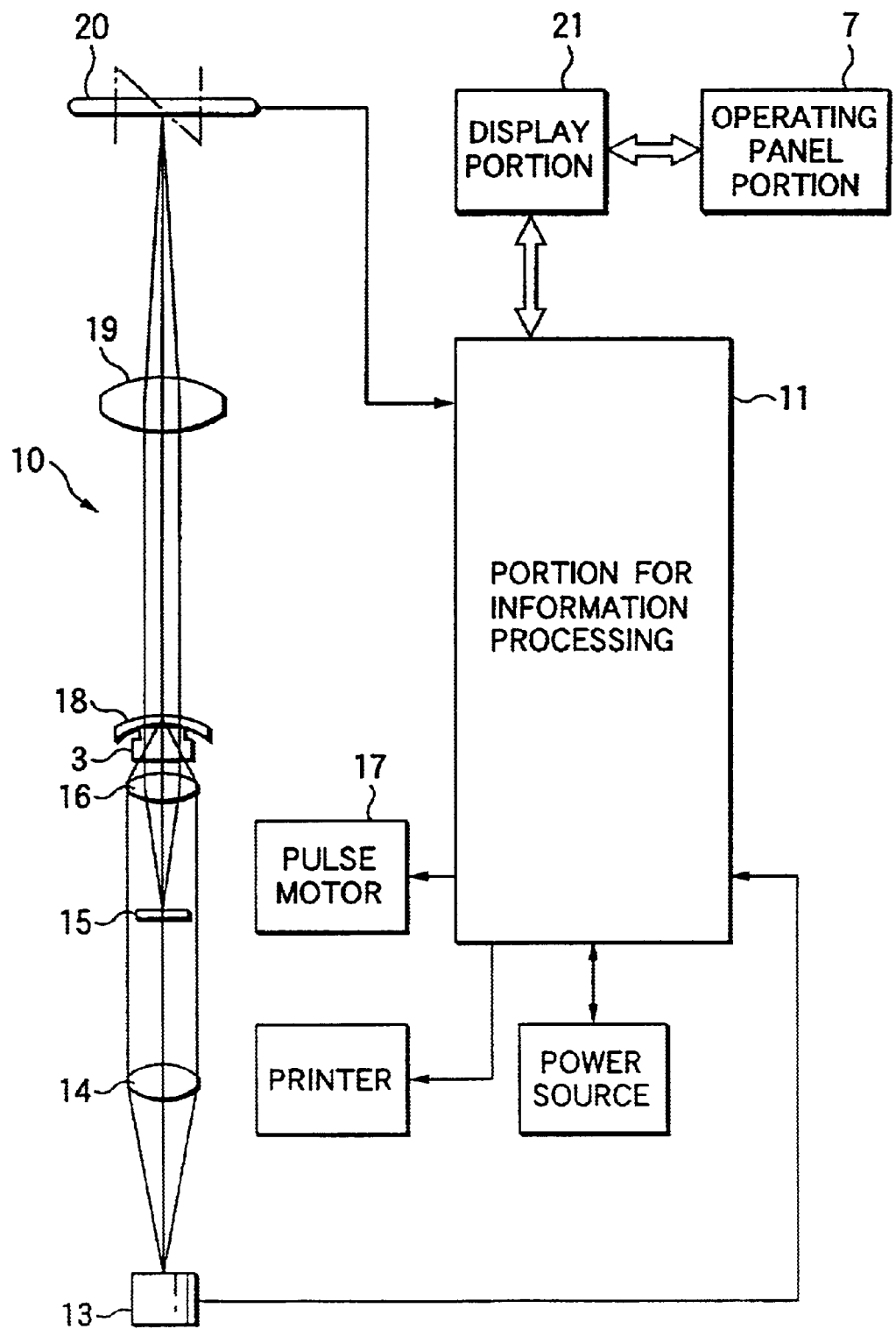
FIG. 4 shows a diagram exhibiting an internal construction of the lens meter of the second preferred embodiment of the present invention.

Contained inside main portion 2 is an optical system for measurement 10 and a information processing portion 11 for information processing (refer to FIG. 4). FIG. 4 schematically illustrates the internal construction of the lens meter 1 as an embodiment of the present invention. The internal construction of lens meter 1 comprises the optical system for measurement 10, the portion 11 for information processing, and a light source 13. The light source 13 for the lens meter 1 is composed of four light emitting diodes (LED) 13a that emit light of an ultra-high luminance.

Figure 5:
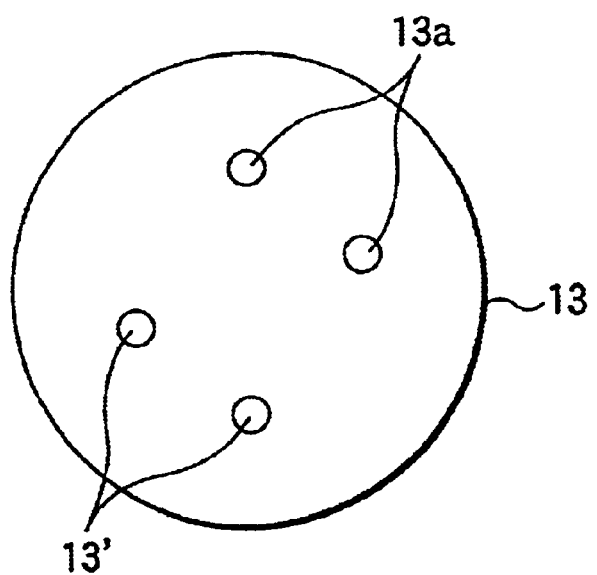
FIG. 5 shows a diagram exhibiting the light source 13.

FIG. 5 illustrates special features of light source 13. Specifically, the four LEDs 13a are arranged at positions separated by the same distance from adjacent units, being equi-distant positions, to simplify a calculation that will be described later. A condenser lens 14 is disposed to receive light from the four LEDs 13a so that the rays from each LED 13a are oriented into parallel rays. This orientation requires that each LED 13a is disposed at the focal point of the condenser lens 14.

Figure 6:
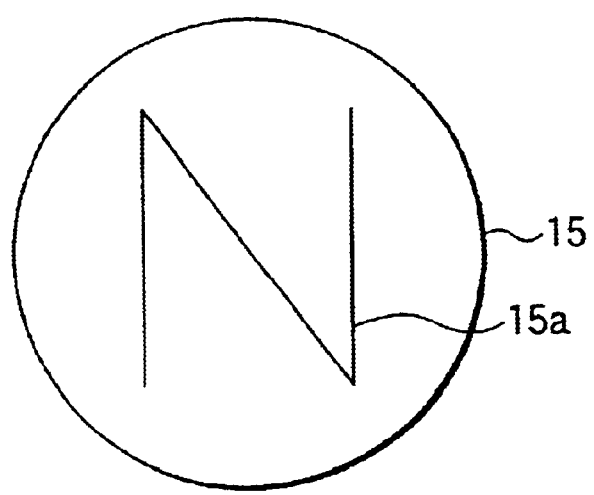
FIG. 6 shows a diagram exhibiting the target plate 15.

Element 15 is a target plate comprising a slit pattern 15a having the shape of "N" as shown in FIG. 6. Target plate 15 is disposed between the condenser lens 14 and a collimator lens 16 in a manner so that target plate 15 is movable by a pulse motor 17. The collimator lens 16 serves to form an image of the light source on the uncut lens for examination 18 (or "examined lens"). In this manner, the combined effect on the light rays effected by collimator lens 16 and examination lens 18 is to orient the rays forming the "N" shaped image of the slit pattern 15a into parallel rays.

The uncut examined lens 18 is set at the measurement table 3 in a manner to place the optical center of the lens 18 at the same position as, or coincident with, the position of the center of the optical system for measurement 10. Element 19 is an object lens that serves to focus the parallel rays of the pattern 15a previously oriented by the combined effects of collimator lens 16 and examination lens 18 so as to form an image of the pattern 15a. The focused image is directed to an image sensor 20 of a charge-coupled device (CCD), which is disposed at the focal point of the object lens 19, and the sensor detects the position of the pattern of the focused image.

The information processing portion 11 serves to control the optical system 10 in accordance with a specific program in cooperation with the following: devices of a control substrate, a circuit for signal processing, a circuit for driving displays, a circuit for driving light sources, a circuit for driving a pulse motor, a circuit for numerical calculation, and a circuit for driving a printer. Information processing portion 11 also performs additional functions for the optical system 10 such as calculating the position of the optical center, preparing and memorizing data regarding relative positions of the optical center, and marking and recording the optical center position data into a specific recording medium or transferring the data to other instruments such as a computer.

In the lens meter 1 having the above construction, the amounts of shift of the above patterns formed on the image sensor 20 from each of four LED 13a is used in the calculations performed by the circuit for numerical calculation of the information processing portion 11. Specifically, a first amount of shift occurs due to the dioptric power (the "power") of the examined lens 18 that is disposed between collimator lens 16 and object lens 19. Target plate 15 is movable and once moved a corresponding second amount of shift is created by the power of the examined lens 18. The information-processing portion 11 uses all of this information, being the first amount of shift, the second amount of shift, and the amount of the movement of target plate 15, to perform a calculation. The results of this calculation include calculated values for other optical properties of the examined lens 18 to include the spherical power, the cylindrical power, the direction of the axis, the prism power, and the direction of the base. In other words, the method for processing a spectacle lens of the present invention uses the lens meter 1 to measure the amount of image shift that occurs due to the movement of the examined lens 18 having a fixed dioptric power, then calculating other optical properties of the lens 18 based upon the amount of the measured shift. Once obtained by calculation, the lens meter 1 can display the calculated results.

The prism value at the "point of measurement" can be measured by determining the central coordinates of the pattern. In this context, the "point of measurement" is typically defined to be an estimated or calculated position close to the true optical center of the lens 18 where the prism value is being measured. The central coordinates of the pattern when the examined lens 18 is "set" at the measurement table 3 are expressed as $(x_1, y_1)$. In this context, the lens 18 is positioned in the lens meter 1 so that the lens meter 1 is poised to measure the prism value at the present "point of measurement," being $(x_1, y_1)$. However, as discussed regarding the prior art, a series of points of measurement may be measured until the true optical center of lens 18 is found. In this context, the coordinates of the previous point of measurement are designated by $(x_0, y_0)$, and correspond to the central coordinates of the pattern when the lens 18 was "not set" at the measurement table 3. In other words, lens 18 is said to be "not set" at the point of measurement $(x_0, y_0)$ because lens 18 is subsequently repositioned or "set" in lens meter 18 so that the new point of measurement is $(x_1, y_1)$.

Subsequently, if the point of measurement $(x_1, y_1)$ is determined to not correspond to the true optical center of the lens 18, the new coordinates are formed by using $(x_1-x_0)$ as the new x-coordinate and $(y_1-y_0)$ as the new y-coordinate. In this manner, the lens meter 1 repositions lens 18 so that the $(x_1-x_0)$ coordinate is set to be the $x_1$ coordinate and the previous $x_1$ coordinate is reset to be the $x_0$ coordinate. Likewise, the $(y_1-y_0)$ coordinate is set to be the $y_1$ coordinate and the previous $y_1$ coordinate is reset to be the $y_0$ coordinate.

$(x_1, y_1)$ in the new coordinates is used to express the prism value P at the set point of measurement of the lens 18. Mathematically, the x-component and the y-component of the prism value P may be expressed by Px and Py, respectively, wherein the relationships between P, Px, Py and θ (θ is the angle in the direction of the base of the prism) are expressed by the following equations:

$$P = \sqrt{Px^2 + Py^2}$$

$$Px = \frac{k}{4}\sum_{i=1}^{4} x_i = \frac{k}{4}(x_1 + x_2 + x_3 + x_4)$$

$$Py = \frac{k}{4}\sum_{i=1}^{4} y_i = \frac{k}{4}(y_1 + y_2 + y_3 + y_4)$$

$$\theta = \tan^{-1}\frac{Py}{Px} \quad \text{(when } Px > 0, Py \geq 0\text{)}$$

$$\theta = \tan^{-1}\frac{Py}{Px} + 180° \quad \text{(when } Px < 0\text{)}$$

$$\theta = \tan^{-1}\frac{Py}{Px} + 360° \quad \text{(when } Px > 0, Py < 0\text{)}$$

$$\theta = 90° \quad \text{(when } Px = 0, Py > 0\text{)}$$

$$\theta = 270° \quad \text{(when } Px = 0, Py > 0\text{)}$$

In the above equations, k represents a proportionality constant.

Information processing portion 11 is used to determine the relative relationship between the position of the point of measurement and the position of the true optical center of the examined lens 18. The relative relationship between the position of the point of measurement and the position of the true optical center for lens 18 is calculated from the prism value at the point of the measurement as follows. With P representing the prism value, D representing the dioptric power of the lens and δ representing the relative distance between the position of the point of measurement and the position of the true optical center, the relationship between these values is: δ=10P/D. Mathematically, when the components of the distance δ in the X-direction and in the Y-direction are represented by δx and δy, respectively, and the components of the prism value P in the X-direction and in the Y-direction are represented by Px and Py, respectively, the relationship between these values can be expressed by X and Y components as: δx=10Px/Dx and δy=10Py/Dy.

The prism value P, the components of the prism value P in the X-direction Px and in the Y-direction Py, the angle in the direction of the base of the prism θ, the spherical power and the cylindrical power of the examined lens 18, as determined by the lens meter 1 as described above, are displayed on display apparatus 9. The relation between the position of the point of measurement and the position of the true optical center is displayed on display apparatus 8. These values are memorized by the information-processing portion 11, recorded by a specific recording medium or transferred to other instruments so that these values can be utilized in processing of the lens in a later step, when necessary.

Figure 7:
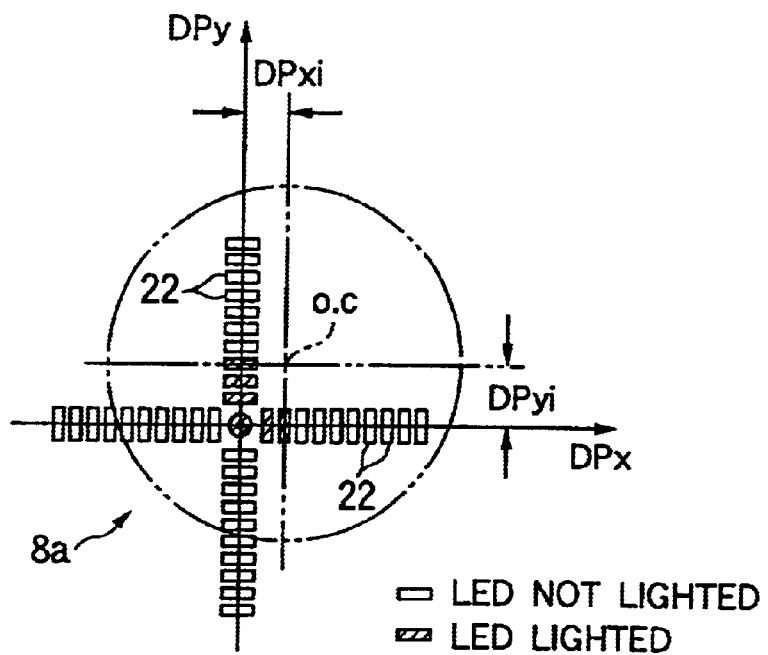
FIGS. 7 and 8 show diagrams exhibiting variations of display apparatus 8 of the third and fourth preferred embodiments of the invention.
Figure 8:
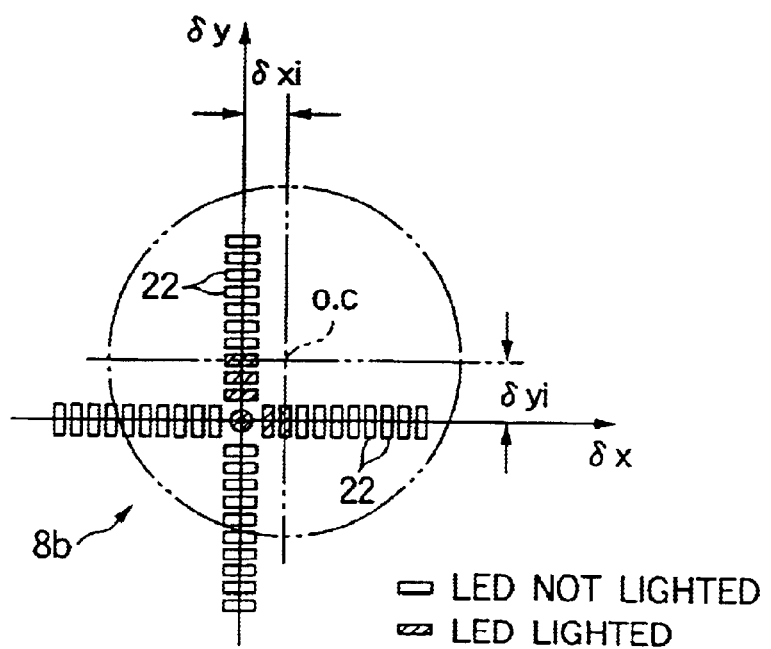

FIGS. 7 and 8 illustrate various embodiments of the display apparatus 8, which displays the relative positions of the point of measurement and the true optical center of the lens for examination. In the embodiment shown in FIG. 7, a number of light emitting diodes (LED) 22 are arranged in the X-direction and in the Y-direction in a manner such that the distance between the adjacent diodes is, for example, 1 mm. The diode disposed at the intersection of the X-axis and the Y-axis has a circular shape whereas the other diodes have a rectangular shape. In FIG. 7, the position of the circular LED corresponds to the position of measurement, the double dotted broken line forming a circle corresponds to the outline of the examined lens 18, and "O.C" designates the optical center of the lens. Based upon the component of the prism value in the X-direction being Px and the dioptric power of the lens 18 being at the point of measurement on lens 18, the component of the position of the optical center (O.C) of the examined lens in the X-direction with respect to the point of the measurement is shown as the prism value DPx$_i$ on the X-axis. The component of the position of the optical center of lens 18 in the Y-direction, with respect to the point of measurement, is shown as the prism value DPy$_i$ on the Y-axis.

In the case as shown in FIG. 7, when the dioptric power of the lens in the horizontal direction is negative, DPx becomes –Px, which is the value obtained by reversing the sign of Px. When the dioptric power is positive, DPx becomes Px. Likewise, when the dioptric power of the lens in the vertical direction is negative, DP$_y$ becomes –Py which is the value obtained by reversing the sign of Py. When the dioptric power is positive, DPy becomes Py. When the dioptric power of the lens in the horizontal direction is zero, DPx becomes zero and, when the dioptric power of the lens in the vertical direction is zero, DPy becomes zero. For this reason, when the dioptric power of the lens in the horizontal direction or in the vertical direction is zero, any position in the horizontal direction or in the vertical direction, respectively, can be along the optical center.

As indicated above, display apparatus 9 displays the values DPx and DPy, and display apparatus 8 shows the position of the optical center with respect to the point of measurement on the examined lens 18 as the prism value on the cross type LED display. In this manner, the amount of shift of the position of the optical center with respect to the center of the optical system for the measurement 10 can be displayed very accurately when the examined lens 18 has a very great dioptric power.

The embodiment shown in FIG. 8 is similar to the embodiment shown in FIG. 7. As in FIG. 7, a number of light emitting diodes (LED) 22 are arranged in the X-direction and in the Y-direction in a manner such that the distance between the adjacent diodes is uniform, thereby forming a cross type array. The diode disposed at the intersection of the X-axis and the Y-axis has a circular shape whereas the other diodes have a rectangular shape. The position of the circular LED corresponds to the position of measurement, the double dotted broken line forming a circle corresponding to the outline of the examined lens 18, and "O.C" designates the optical center of the lens. In the embodiment shown in FIG. 8, however, based on the components of the prism value Px in the X-direction and Py in the Y-direction as indicated at the point of measurement on examined lens 18, and the dioptric power of the lens at the point of measurement, the component of the position of the optical center for lens 18 in the X-direction, with respect to the position of measurement, is exhibited as the distance δx on the X-axis. The component of the position of the optical center for lens 18 in the Y-direction, with respect to the position of measurement, is exhibited as the distance δy on the Y-axis.

As indicated above, when the display apparatus 8 displays the components of the position of the optical center of the lens for examination in the X-direction and in the Y-direction with respect to the point of the measurement of the lens for the measurement as the distance on the cross type LED display. In this manner, the amount of shift of the position of the optical center with respect to the center of the optical system for the measurement 10 can be displayed very accurately when the examined lens 18 has a very small dioptric power.

One example of the method for obtaining the prism value is described in the above embodiment. However, the method for obtaining the prism value may be varied depending on the slit pattern and the construction of the image sensor without departing from the spirit of the present invention. For example, the prism value may be obtained in accordance with other conventional methods such as the methods described in Japanese Patent Application Laid-Open No. Showa 60(1985)-17335 and U.S. Pat. No. 4,180,325.

In the above embodiments of the invention, the cross arrangement of the LED display is used for display apparatus 8. Of course, those skilled in the art will appreciate that other display apparatuses having X-and Y-coordinates, such as liquid crystal displays and cathode ray tube displays, may be used without departing from the spirit of the present invention.

Figure 9:
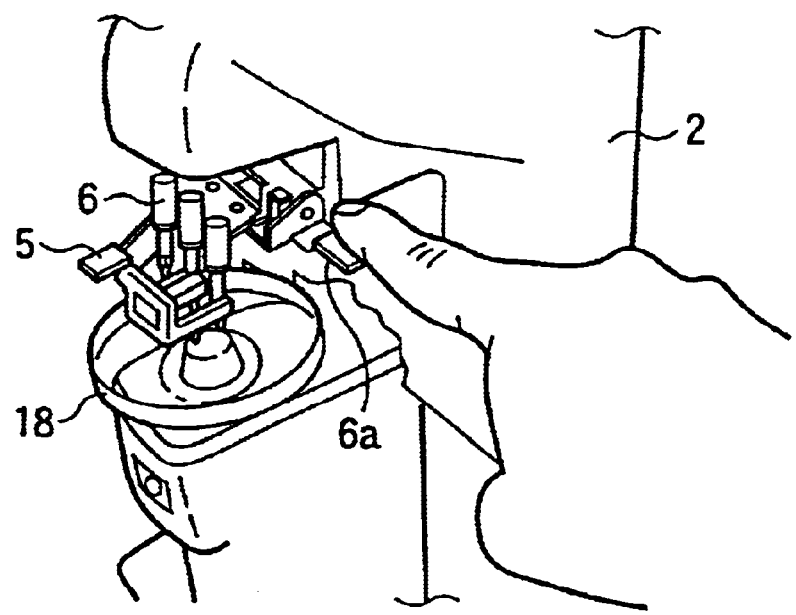
FIG. 9 shows a diagram describing the operation of marking.
Figure 10:
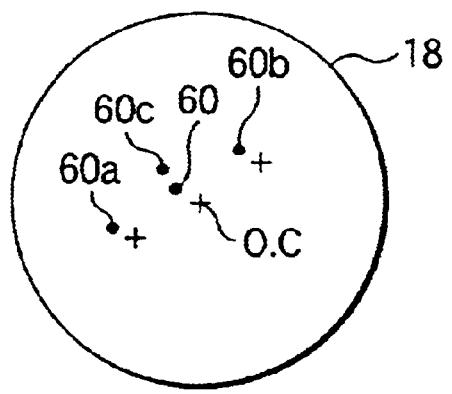
FIG. 10 shows a diagram exhibiting an example of marks placed on the lens in accordance with the present invention.

After the measurement of the prism value and the calculation of the position of the optical center have been completed, guiding marks are placed on the examined lens 18. For the marking process, the first mark 60 is placed as shown in FIG. 10 at the position of the measurement of the prism value by operating a marking lever 6a as shown in FIG. 9 while the examined lens 18 lens is fixed at the position of the measurement of the prism value. Next, second mark 60a, third mark 60b, and fourth mark 60c are simultaneously placed onto lens 18. The second and third marks 60a and 60b respectively are placed on lens 18 on a straight line passing through the first mark 60, thereby showing the direction of the cylinder axis. The fourth mark 60c serves for recognizing vertical positions of the marks. The relationships between the positions have been specified in advance and are conventionally known to those skilled in the art. In general, the positions of the marks are different from the position of the optical center O.C because, in the present embodiment, the marks are not required to be placed at the position of the optical center; instead, the examined lens 18 may be placed at a suitable position, selected as desired. In this case, the first mark is placed at the position of measurement by "free marking," wherein the position of measurement is decided to be the position where the examined lens 18 is disposed.

Figure 11:
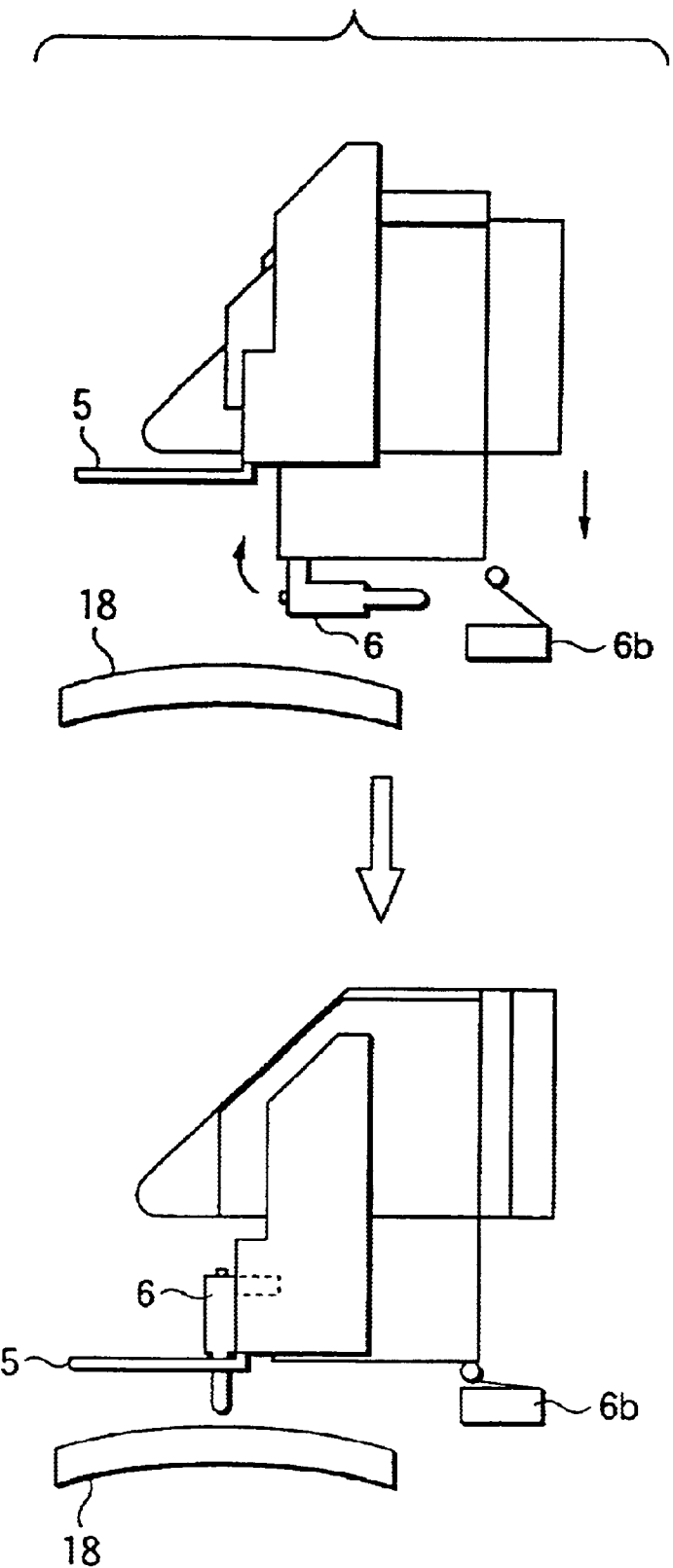
FIG. 11 shows an expanded view of the portion for marking.

As illustrated in FIG. 11, a switch 6b for detecting the marking operation is disposed at the portion 6 for marking (also known as the "marking portion") so that the switch 6b operates at the moment when the mark is placed. When the switch 6b is operated, the prism value obtained by using the marked position as the position of measurement and the relation between the position of measurement calculated from the prism value and the position of the optical center of the examined lens are memorized by the information processing portion 11, and/or recorded by a specific recording medium or transferred to another instrument so that the information can be used in the processing of the lens in the next step, when necessary.

Figure 12:
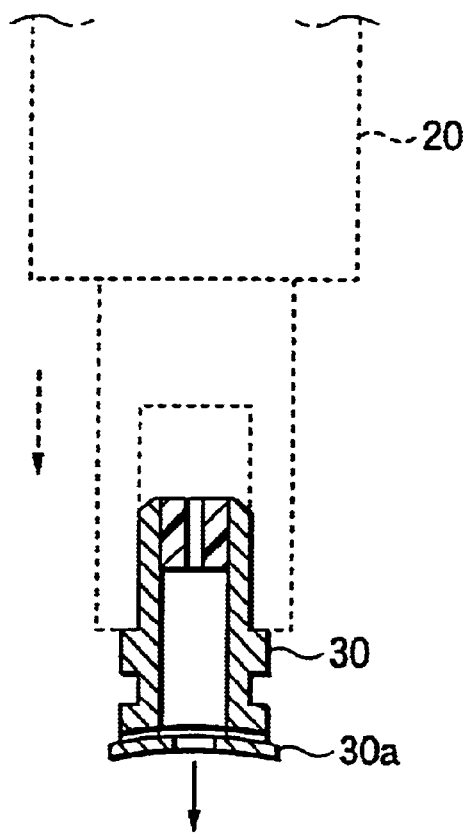
FIG. 12 shows a diagram describing the operation of blocking a lens holder to a lens.
Figure 12:
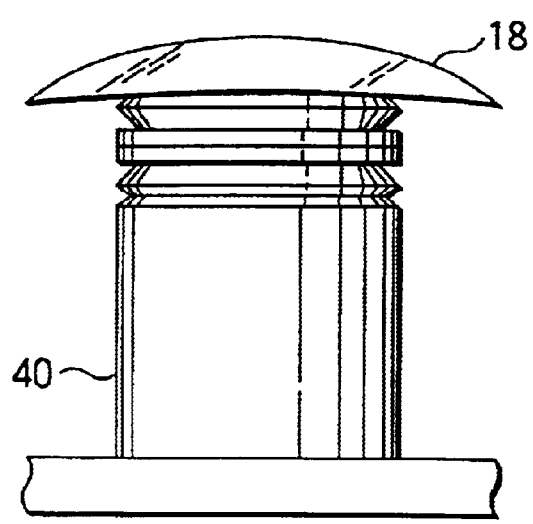
Figure 13:
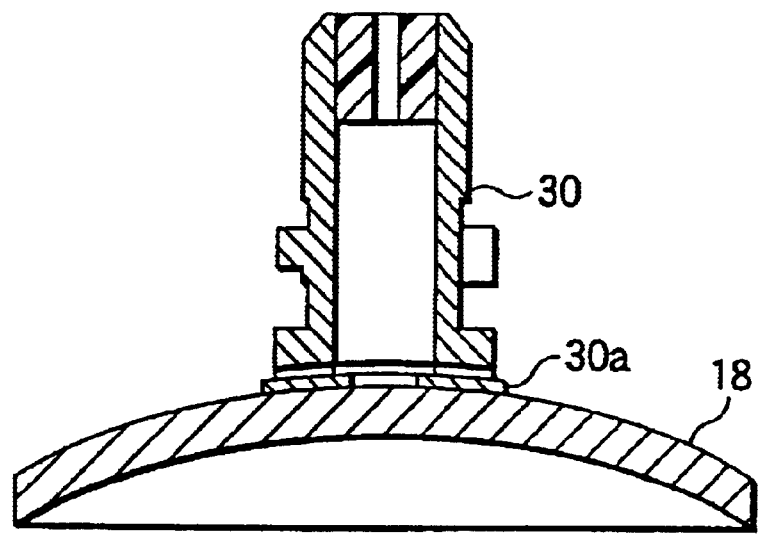
FIG. 13 shows a diagram exhibiting a lens holder blocked ("attached") to a lens.
Figure 14:
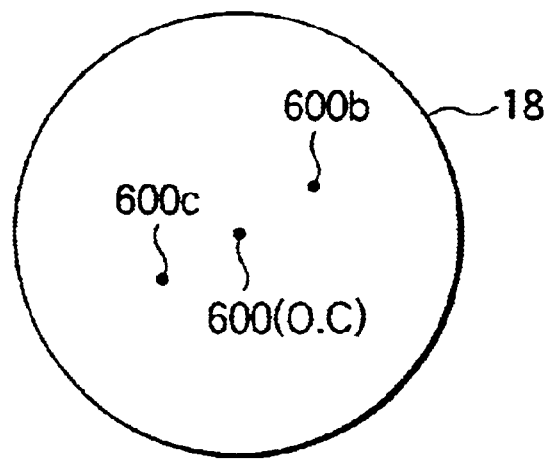
FIG. 14 show a spectacle lens of the prior art with a mark placed at the optical center (O.C) and two other marks defining a cylinder axis.

To perform the step of blocking the uncut, examined lens 18 on which the marks have been placed as described above, a lens holder 30 is attached to the lens 18 before the sub-step of cut processing (grinding or cutting) can be performed to complete the step of lens processing. As shown in FIG. 12, a lens holder 30 held by an apparatus 20 for attaching a lens holder is pressed to the surface of the lens 18 fixed on a table 40 for fixing a lens. In other words, lens 18 is removed from the lens meter 1 at the conclusion of the measuring step and is set, or positioned, on processing table 40 of a lens processing apparatus where the step of blocking is performed. The lens holder 30 attaches to lens 18 by adhesion via adhesive sheet 30a. In this manner, as shown in FIG. 13, the lens holder is attached to the lens 18.

When the lens holder 30 is attached, or "blocked," to the lens 18, the position of attachment where the lens holder 30 attaches to the lens 18 is also the position of the rotational center of the lens 18 during the cut processing sub-step. In other words, this position of attachment is used as the reference position for the cut processing process. In general, the lens holder is attached at the position corresponding to the position of the optical center of the lens 18. It is also necessary that the lens holder 30 be attached to the lens 18 in a manner that orients the cylinder axis of the lens in a specific direction relative to the rotational center reference position. Specifically, the cylinder axis should be oriented relative to the rotational center reference position and in the direction of rotation of the lens holder 30. To achieve this purpose, the guiding marks placed by the above-described marking operation are detected and the positions specified. In other words, the positions of the marks relative to the reference position of the apparatus for attaching a lens holder 20 are specified. Although not shown in the Figures, an apparatus for image processing disposed in the apparatus 20 for attaching a lens holder specifies the positions of the marks.

When the positions of the marks are specified, the data which have been obtained in the step of measuring a lens then calculated and transferred by the lens meter to the lens processing apparatus, (i.e., the data showing the relation between the positions of the marks and the position of the optical center), are read by a computer controlling the lens processing apparatus and the position of the optical center is specified by the computer of the lens processing apparatus. In this context, "specified" means to determine a position on the previously marked lens 18, wherein the marks on the lens are used as a guide to determined the position of a useful reference point, such as the optical center of the lens, by using the data showing the relationship between the marks and the calculated position of the optical center. In this manner, the useful reference point such as the optical center of the lens that was determined by calculating the position of the optical center based upon a measurement of optical properties that was performed when the lens 18 was set in the lens meter 1 can be relocated when the lens 18 is set in the lens processing apparatus. The lens holder 30 of the lens processing apparatus is attached to the specified position of the optical center of the lens 18 specified as described above. The lens to which the lens holder 30 has been attached is set to, and positioned in, a conventional apparatus for processing a spectacle lens and processed, typically by grinding or cutting.

As described in the above specification, the method of the present invention comprises the step of measuring a lens in which the optical properties and the reference position of the spectacle lens are measured and the step of lens processing in which the lens is processed based on the optical information obtained in the step of measuring a lens. In the step of measuring a lens, optical properties, such as the prism value of the lens, are measured at a selected or desired position selected in the uncut lens. This selected or desired position where a measurement takes place is the position of measurement. An optical reference position, such as the position of the optical center, is calculated from the measured optical value obtained by measuring at the position of measurement. Subsequently, a guiding mark is placed at the calculated optical reference position and the relation between the position of the mark and the calculated optical reference position is memorized (also referred to as "saved"), recorded or transferred to another instrument. In the step of lens processing, the position of the mark is detected and specified. The processing reference position, such as the position of the optical center, is specified based on the position of the mark and the data that have been memorized, recorded or transferred, and the lens is subsequently cut processed. As described above, in accordance with the method for processing a spectacle lens, the mark can be placed at a position selected as desired easily and rapidly without the possibility of accidentally damaging the lens. The lens meter used in the method therefore has the same advantages.

While the present invention has been described with reference to certain preferred embodiments, one of ordinary skill in the art will recognize that additions, deletions, substitutions, modifications, and improvements can be made while remaining within the spirit and scope of the present invention as defined by the appended claims.

What is claimed is:

1. A method for processing a spectacle lens, comprising:
   measuring a lens and processing the lens,
   wherein the measuring step comprises collecting optical information including calculating a calculated position of an optical reference point by using a lens meter for measuring optical properties of the lens, the optical properties including a prism value, and the processing step comprises using the optical information collected in the measuring step as a portion of data for effecting lens processing, wherein the measuring step further comprises:

measuring the optical properties, including the prism value, of the lens to generate measured data by measuring the optical properties at a point selected on the lens, wherein the selected point is a point of measurement;

calculating a calculated optical reference point position, including a calculated position of an optical center, on the lens using the measured data generated by measuring;

marking the lens by placing a mark on the lens at the point of measurement or at a point located at a position relative to the point of measurement, and generating mark data representing the position of the mark;

processing the mark data representing the position of the mark to determine a relative relationship between the position of the mark and the calculated position of the optical reference point, thereby generating first data representing the relationship between the position of the mark and the calculated position of the optical reference point; and saving the first data to a memory medium, or recording the first data to a recording medium, or transmitting the first data to a lens processing apparatus, so that the first data is subsequently available for effecting the lens processing.

2. A method for processing a spectacle lens as claimed in claim 1, wherein the first data is saved to a memory medium or recorded to a recording medium.

3. A method for processing a spectacle lens as claimed in claim 2, wherein the step of processing the mark data further comprises:

detecting the mark on the lens and measuring the position of the mark;

reading the first data from the memory medium when the first data is stored in the memory medium, or reading the first data from the recording medium when the first data is stored on a recording medium;

specifying a specified position of an optical reference point, including a specified position of the optical center, on the lens, wherein the specified position of the optical reference point is determined using the mark data and the first data; and processing the lens further comprises attaching a lens holder to a position on the lens prior to cut processing , wherein the specified position of the optical reference point is used as the position for attaching the lens holder to the lens.

4. A method for processing a spectacle lens comprising the steps of:

(a) supplying an uncut lens and setting the lens in a lens meter, wherein the lens meter has a first information processing portion;

(b) measuring optical properties of the lens at a point of measurement on the lens to generate measured data, wherein the optical properties include a prism value;

(c) calculating a calculated optical reference point position, including a calculated position of an optical center, on the lens using the measured data, wherein the calculated optical reference point position is calculated by the first information processing portion;

(d) marking the lens with a mark placed at a position on the lens at the point of measurement or at a point relative to the point of measurement, and generating first mark data representing the position of the mark;

(e) processing the first mark data to determine a relative relationship between the position of the mark and the calculated position of the optical reference point, thereby generating third data representing the relationship between the position of the mark and the calculated position of the optical reference point;

(f) saving the third data to a memory medium, or recording the third data to a recording medium, or transmitting the third data from the lens meter to a lens processing apparatus, so that the first data is subsequently available for affecting lens processing;

(g) removing the lens from the lens meter and setting the lens on a processing table of a lens processing apparatus where blocking is performed, the lens processing apparatus comprising a second information processing portion;

(h) detecting the mark on the lens and measuring the position of the detected mark to generate second mark data, wherein the second mark data represents the position of the mark as measured;

(i) reading the third data from the memory when saved or from the recording medium when recorded, or receiving the third data from the lens meter, wherein the second information portion reads the third data;

(j) specifying a specified position of an optical reference point, including a specified position of the optical center, on the lens wherein the specified position of the optical reference point is determined using the measured mark data and the third data;

(k) blocking a lens holder to the lens at a position of attachment on the lens, where the position of attachment corresponds to the specified position of the optical reference point; and (l) subsequently cut processing the uncut lens while blocked to the lens holder to produce a spectacle lens.

5. A lens meter comprising:

a first measuring portion for measuring optical properties of a lens, wherein the first portion measures the optical properties, including a prism value, at a selected point of measurement on a lens to be measured and operates to transmit data representing the measured optical properties and data representing the position of the point of measurement;

a second marking portion for marking the lens, wherein the second portion is disposed in proximity to the first portion and operates to place a mark at the point of measurement or at a point relative to the point of measurement on the lens and operates to transmit data representing the position of the mark; and a third information processing portion for information processing, wherein the third portion is operationally connected to the first portion and the second portion and operates to receive the data representing the measured optical properties and the data representing the position of the point of measurement from the first portion and to receive data representing the position of the mark from the second portion, the third portion further operates to calculate a calculated position of an optical reference point, including a calculated position of an optical center, on the measured lens in response to receiving data representing the measured optical properties from the first portion, to generate data representing a relationship between the position of the mark and the calculated position of the optical reference point in response to receiving data representing the position of the mark transmitted from the second portion, and subsequent to calculating the calculated position of the optical reference point, the third portion operates to transmit data representing the relationship between the position of the mark and the calculated position of the optical reference point to a memory medium, a recording medium, or to a lens processing apparatus for lens processing that is operationally connected to the third portion.

6. An apparatus for processing a spectacle lens comprising a lens meter according to claim 5.

7. An apparatus for processing a spectacle lens, the apparatus comprising a lens meter having an information-processing portion, the information processing portion comprising:

a circuit for signal processing, where the circuit for signal processing receives a first signal from an optical system for measurement and a second signal from a lens marking portion, wherein the first signal corresponds to data measured by the optical system and the second signal corresponds to data generated by the lens marking portion;

a circuit for numerical calculation, wherein the circuit for numerical calculation calculates a calculated optical reference point position, including a calculated position of an optical center in response to receiving the first signal from the optical system for measurement, and the circuit for numerical calculation processes the calculated position of the optical center and the second signal from the lens marking portion to determine a relationship between the calculated position of the optical center and the second signal, thereby generating output data representing the relationship between the calculated position of the optical center and the second signal; and a data storage medium for storing the output data until the output data is outputted to a lens processing apparatus in communication with the information processing portion of the lens meter.

* * * * *